April 28, 1925.

W. H. FULTON

PIPE COUPLING

Filed Aug. 15, 1919

1,535,219

William H. Fulton, Inventor
By his Attorney
Thomas Howe

Patented Apr. 28, 1925.

1,535,219

UNITED STATES PATENT OFFICE.

WILLIAM H. FULTON, OF IRVINGTON, NEW JERSEY, ASSIGNOR, BY MESNE ASSIGNMENTS, TO TITEFLEX METAL HOSE CO., A CORPORATION OF NEW JERSEY.

PIPE COUPLING.

Application filed August 15, 1919. Serial No. 317,642.

*To all whom it may concern:*

Be it known that I, WILLIAM H. FULTON, a citizen of the United States of America, residing at Irvington, county of Essex, and State of New Jersey, have invented new and useful Improvements in Pipe Couplings, of which the following is a specification.

This invention relates to pipe couplings and is particularly adapted for use in connection with swivel couplings.

One object of the invention is to provide diaphragmatic means acted upon by the fluid pressure on the interior of the coupling to close any leakage paths for the fluid between the two members.

A further object of the invention is to prevent undue tipping or tilting of one of the members, especially in a swivel coupling, with relation to the other.

A further object of the invention is to provide a coupling which shall be readily assembled or disassembled and having simplicity of construction.

Other and ancillary objects of the invention will appear hereinafter.

In the accompanying drawings, which illustrate the invention—

Figure 1:
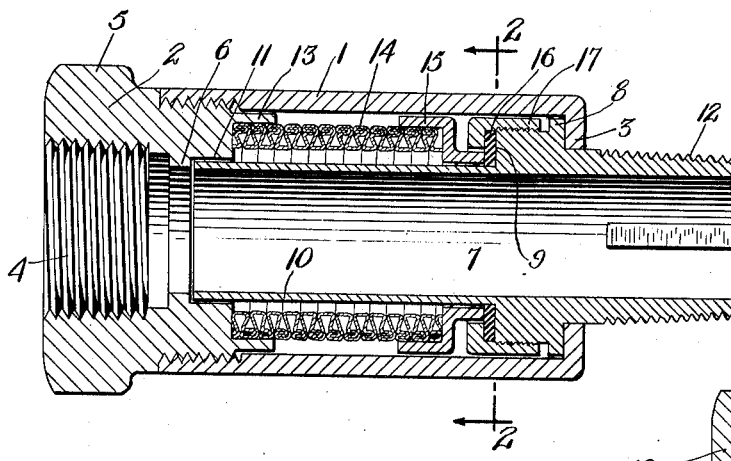
Fig. 1 is a longitudinal section of a coupling embodying the invention.

Referring to the drawings, one of the coupling members comprises a sleeve 1, and a plug 2 screwed into one end of the sleeve 1. At the other end of the sleeve is an inturned flange 3. The plug comprises screw threads 4 whereby it may be joined to the end of a pipe and the usual polygonal periphery 5 whereby a wrench may be engaged with it for turning it to screw it into the sleeve or for any other purpose. Also the plug has an internal flange 6 for a purpose as will be hereinafter referred to. Telescoping within the member just referred to, is a second member 7 which enters within the aforesaid member through the opening at the interior edge of the flange 3 and is provided with a flange or shoulder 8 bearing upon the inside face of the flange 3 to form a swivel bearing. Also upon the member 7 is a shoulder 9 and from the shoulder 9 extends the cylindrical projection 10 which enters within a recess 11 in the plug 2. Also this second member is provided with a threaded nipple 12 by which it may be joined to a pipe section or other orifice to which it is desired to connect the pipe secured to the plug.

Secured, as by soldering, to a longitudinally extending flange 13 on the plug 2, is the end of a corrugated tube 14 and the other end of the corrugated tube is similarly secured to a seat member 15 forced by the tendency of the tube 14 to lengthen, against the shoulder 9. This seat member might bear directly against the shoulder 9 but on account of the difficulties in machining and fitting, a gasket 16 may be provided for the seat member to bear against and this gasket may be held in position by a flanged collar 17 screwed upon the shoulder 9.

The joints of the tube 14, at its ends, with the plug and the seat member 15 respectively, should be fluid tight. The tube 14 may be of a construction as shown in patent to Louis H. Brinkman No. 1,198,392 particularly as shown in Fig. 7 thereof. The tube may also be of the structure as shown in the patent to Louis H. Brinkman No. 1,120,268 or of any other suitable construction of a corrugated tube which tends to lengthen when the pressure upon its interior is increased. The tube shown is that of the first mentioned Brinkman patent.

The parts are made with clearances as shown so that they may be easily moved without binding. The fluid passing through the device can enter between the plug 2 and the projection 10 into the space within the corrugated tube 14. This tube, however, presses the seat member 15 against the gasket 16 so that the fluid can get no further. Fluid pressure within the tube 14 tends to cause it to lengthen and the greater the pressure the more forceful is this tendency. Accordingly the seat member 15 is pressed the more strongly against the gasket 16 and the joint made tighter the higher the pressure. The device is therefore especially adapted for carrying fluids under high pressure for the reason that the higher the pressure the more securely is the joint maintained fluid tight.

Figure 3:
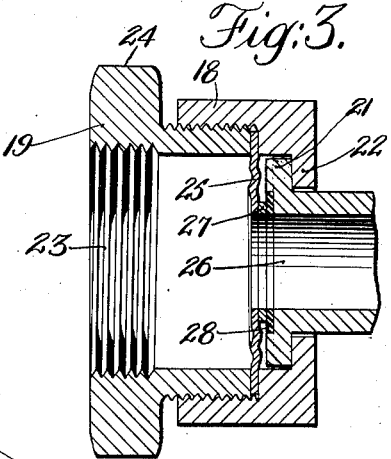
Fig. 3 is a longitudinal section of a modification.
Figure 2:
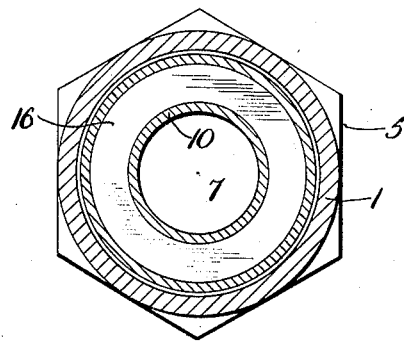
Fig. 2 is a section on the line 2—2 of Fig. 1.

Referring to the structure in Fig. 3, the diaphragmatic means or member therein shown consists in a disc instead of a tube. One of the members of the coupling comprises the sleeve 18 into which is screwed the plug 19, while the other coupling member comprises the tube 20 having the flange 21 which bears upon the interior of the flange 22 on the sleeve 18, the flange 21 turning upon the flange 22 in the swiveling action. The plug 19 is provided with threads 23 for securing to a pipe section to be connected, and also has a periphery 24 adapted for engagement by a wrench as before described. Clamped between the sleeve 18 and the plug 19 is a disc or diaphragm 25 with a central hole 26 whereby the fluid may pass through the coupling. About this hole 26 is a seat ring 27 secured to the diaphragm and this ring may seat upon the end of the pipe 20 but for reasons of machining and fitting, as referred to in connection with the apparatus of Fig. 1, a gasket 28 is preferably provided and the ring 27 bears upon this. The diaphragm 25 has a spring or bias tending to force the said ring 27 against the gasket and when pressure is brought to bear upon the inside of the coupling, this bearing against the left hand side (Fig. 3) of the diaphragm 25 will tend to force the ring 27 all the tighter against the gasket. Consequently as the fluid pressure within the coupling rises the more securely will the ring 27 be pressed against the gasket.

While the invention has been illustrated in what is considered its best applications, it may have other embodiments without departing from its spirit and is not therefore, limited to the structures shown in the drawings.

What I claim is:

1. In a pipe coupling, the combination with a plurality of coupling members of a diaphragmatic means subjected to the fluid pressure within said coupling for preventing leakage between said members, said means being secured to one of said members and unsecured to but bearing against the other of said members.

2. In a pipe coupling, the combination with a plurality of coupling members, of a diaphragmatic member secured to one of said coupling members in fluid tight relation and bearing against but being unsecured to the other of said coupling members, said diaphragmatic member being exposed to the fluid pressure within said coupling to press it against said last mentioned coupling member.

3. In a pipe coupling, the combination with two telescoping members provided with means for preventing longitudinal withdrawal of one of said members from the other, and a diaphragmatic member, exposed to the fluid pressure within the coupling secured to one of said members and bearing against but being unsecured to the other of said members.

4. In a pipe coupling, the combination with telescoping swiveling members, of a corrugated tube interposed between said members, said tube being secured to one of said members and bearing against but being unsecured to the other of said members.

5. In a pipe coupling, the combination with one member comprising a sleeve and two abutments, of a second member entered within the first mentioned member and having a flange between said abutments bearing against one of them and turning upon it in the swiveling action of said members, and a corrugated tube secured at one end to one of said members bearing against the other of said abutments and said second member.

6. In a pipe coupling, the combination with one member comprising a sleeve and two abutments, of a second member entered within the first mentioned member and having a flange between said abutments bearing against one of them and turning upon it in the swiveling action of said members, a seat member adapted to bear against said second member, and a corrugated tube secured at one end to one of said members engaging with the other of said abutments and said seat member.

7. In a pipe coupling, the combination with a member comprising a sleeve having a flange at one end, a plug screwed into said sleeve at its other end, a second member extending into said member through said flange, and having a flange bearing against the inside of the aforesaid flange to form a swivel bearing, a seat member bearing against said second member and a corrugated tube engaging said plug at one end and said seat member at the other.

8. In a pipe coupling, the combination with a plurality of coupling members, of a diaphragmatic means subjected to the pressure of the fluid within the coupling for preventing leakage between the members, and means comprising a tube secured at one end and free at the other for opposing the tilting of said members with relation to each other.

9. In a pipe coupling, the combination with a coupling member comprising a sleeve having a flange at one end and a plug at the other, of a second coupling member entered within the said first mentioned coupling member, said second coupling member having a flange bearing against the inside of the said flange on said sleeve and extending within a recess in said plug, and a corrugated tube encircling said second member and engaging with said coupling members at its respective ends.

10. In a pipe coupling, the combination with a coupling member comprising a sleeve having a flange at one end and a plug at the other, of a second coupling member entered within the said first mentioned coupling member, said second coupling member having a flange bearing against the inside of the said flange on said sleeve and extending within a recess in said plug, and a corrugated tube encircling said second member and engaging with said coupling members at its respective ends, said plug having a central passage and a flange therein to limit the longitudinal movement of the said second member.

11. In a pipe coupling, the combination with one member comprising a sleeve and two abutments, of a second member entered within the first mentioned member and having a flange bearing against one of said abutments and turning upon it in the swiveling action of said members, and a corrugated tube within the sleeve, there being a clearance between the sleeve and tube, said tube bearing against the said members.

12. In a pipe coupling, the combination with one member comprising a sleeve and two abutments, of a second member entered within the first mentioned member and having a flange bearing against one of said abutments and turning upon it in the swiveling action of said members and a corrugated tube secured to one of said members and bearing against but being unsecured to the other of said members.

In testimony whereof I have signed this specification this 14th day of August 1919.

WILLIAM H. FULTON.